UNITED STATES PATENT OFFICE.

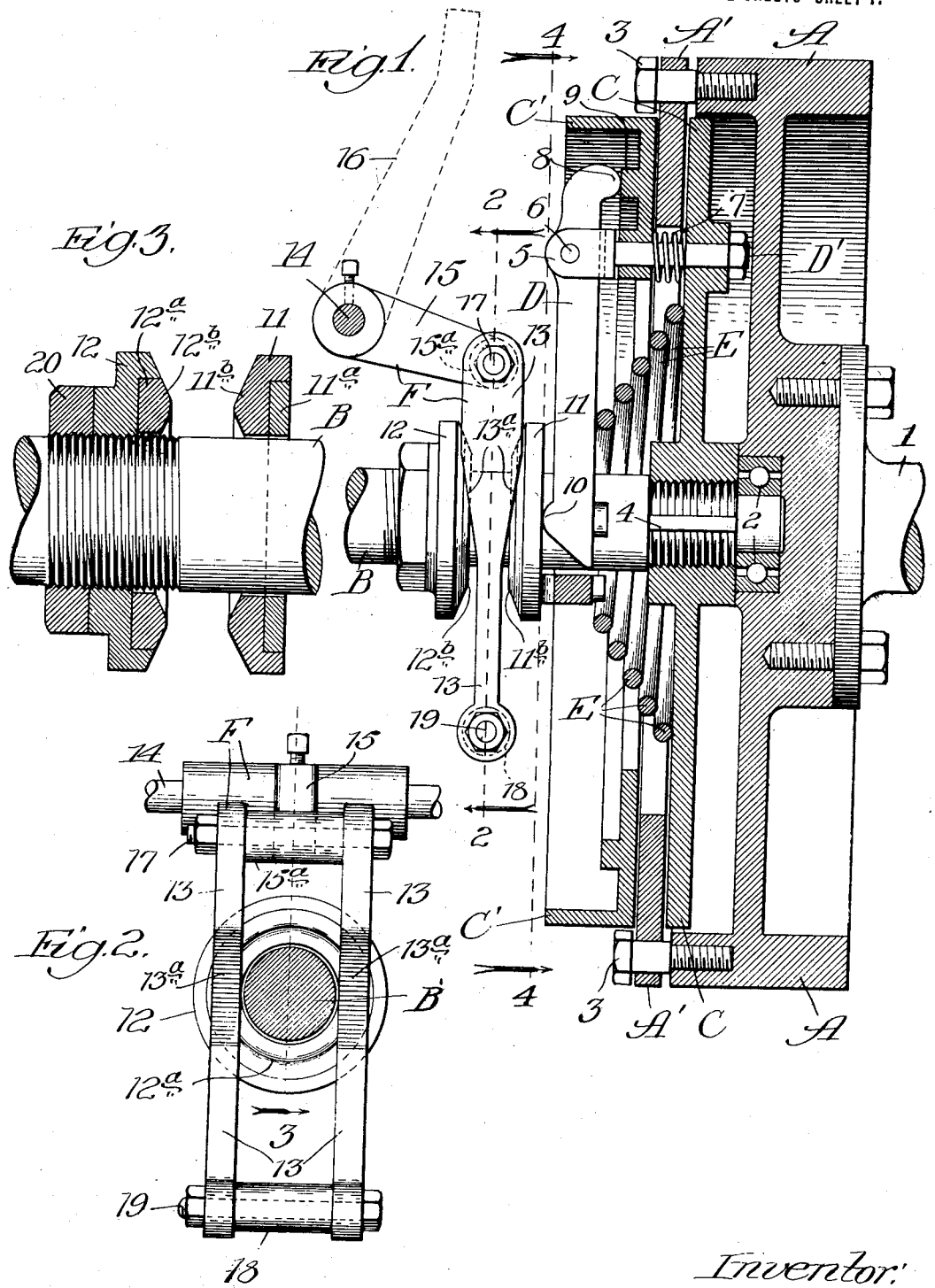

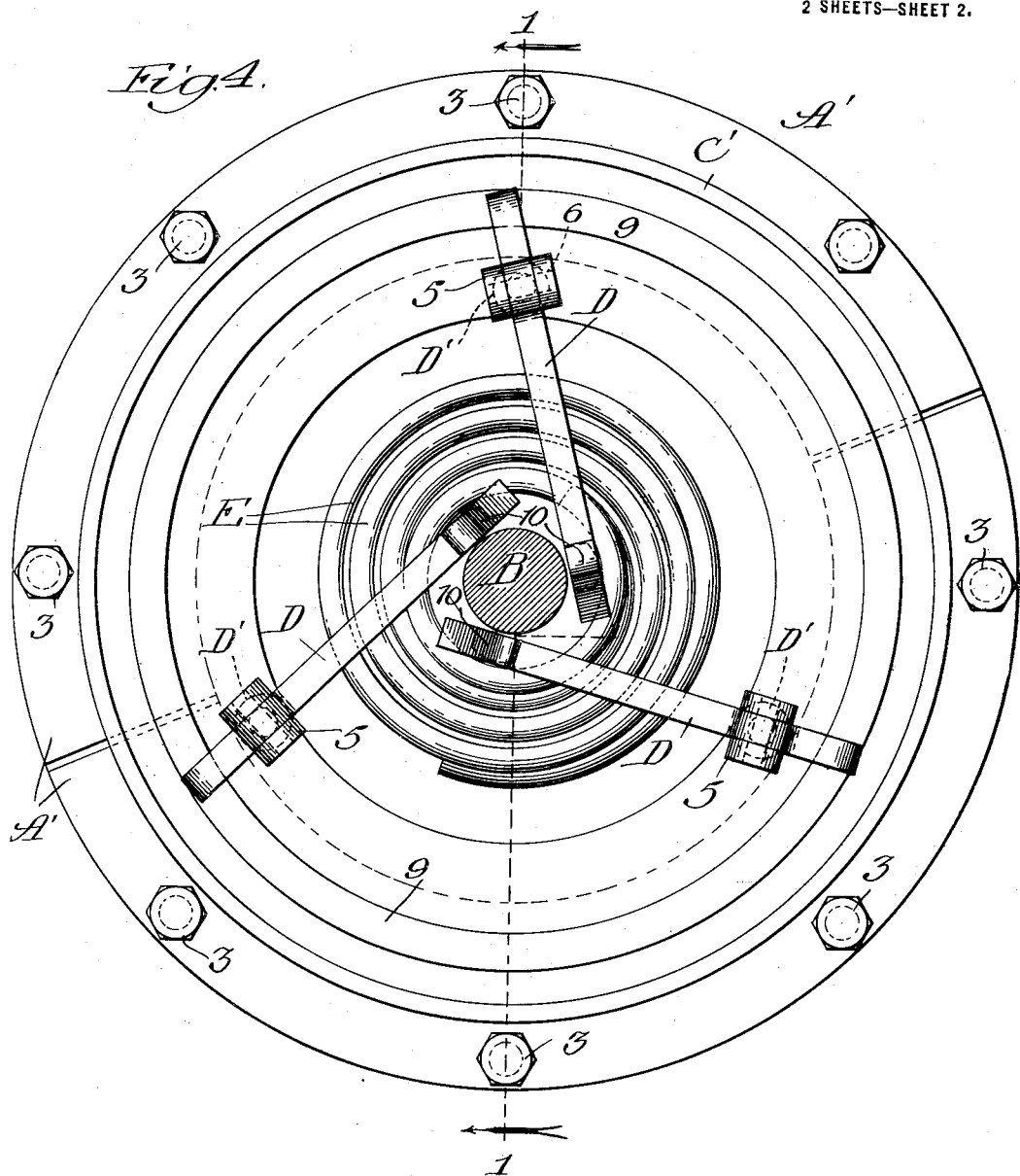

JACOB LAUTH, OF CHICAGO, ILLINOIS.

CLUTCH MECHANISM.

1,405,927.

Specification of Letters Patent.  Patented Feb. 7, 1922.

Application filed February 14, 1920. Serial No. 358,719.

*To all whom it may concern:*

Be it known that I, JACOB LAUTH, a citizen of the United States, residing at Chicago, in the county of Cook and State of Illinois, have invented a new and useful Improvement in Clutch Mechanism, of which the following is a specification.

This invention relates particularly to clutch mechanism adapted for automobile and motor-vehicle use; and the primary object is to provide improved clutch mechanism of compact character.

The invention is illustrated, in its preferred embodiment, in the accompanying drawings, in which—

Fig. 1 represents a broken sectional view of clutch mechanism embodying the invention; Fig. 2, a section taken as indicated at line 2—2 of Fig. 1; Fig. 3, an enlarged broken sectional view taken as indicated at line 3 of Fig. 2 showing a detail of the clutch-releasing means; and Fig. 4, a section taken as indicated at line 4—4 of Fig. 1.

In the illustration given, A represents a wheel, such as the fly-wheel of an automobile engine, which is equipped with a friction member A'; B, a shaft adapted to be actuated by the clutch mechanism; C, a clamping member mounted on the front end of the shaft B and disposed in front of the friction-disk A'; C', a clamping member carried by the member C and located on the opposite side of the friction-disk A'; D, a series of levers mounted on rearwardly-projecting studs D' carried by the disk C; E, a spring serving to force the inner ends of the levers rearwardly and thus cause the members C and C' to clamp the friction ring A'; and F, means for effecting release of the clutch.

In the illustration given, the fly-wheel A is shown secured to the rear end of an engine-shaft 1; and the front end of the shaft B is shown journaled in a central bearing 2, with which the fly-wheel is provided. The friction-ring A' preferably comprises two or more sections, for the purpose of facilitating renewal. These sections are provided with perforations which freely receive cap-screws 3 by means of which the sections are secured to the fly-wheel. Thus, the annular friction-disk A' is movably mounted on the studs, or cap-screws, 3, so that it is freely suspended between the clamping members.

The clamping disk C has a hub-portion screwed on to the front end-portion of the shaft B, and held in place by a key 4.

As has been indicated, the clamping-member C' is carried by the studs, or bolts, D'. This is effected by providing the member C' with perforations through which the studs extend. The studs are provided in the rear of the member C' with forked heads 5, which receive the levers D, the levers being mounted on pivots 6 carried by the furcated ends of the studs. The member C' is capable of moving freely on the studs. Encircling the studs D' and interposed between the clamping members C and C' are the small springs 7, which tend to keep the clamping members separated from the friction-disk A' when the clutch is released.

The levers D are disposed parallel with the plane of the clamping members. They have short outer arms provided with bearings 8, which engage an annular bearing ring 9, with which the clamping member C' is equipped on its rear surface. The levers extend in a general radial direction, but have their inner ends projecting past the sides of the shaft B, the inner ends of the levers being provided with bearings 10 which engage a shiftable collar 11 mounted on the shaft B, said collar constituting a portion of the clutch-releasing mechanism F.

The clutch-releasing mechanism F comprises, further, an adjustable bearing, or collar, 12, mounted on the shaft B; a pair of vertically disposed wedge-members 13 interposed between the collars 11 and 12 and embracing the shaft B; and a rock-shaft 14 equipped with an arm 15 which is pivotally connected with the upper ends of the wedge-members 13. The rock-shaft also has secured thereto the usual clutch pedal 16 (shown in dotted lines), by means of which the rock-shaft is actuated when it is desired to effect release of the clutch.

The collar 11 is preferably provided with an insert washer 11$^a$, which is free to rotate with relation to the collar. Also, the collar 12 is provided with an insert washer 12$^a$, which is free to rotate with relation to the collar. The purpose is to reduce the friction when the clutch-releasing mechanism is actuated.

The wedge-members 13 are provided with beveled portions 13$^a$, which are adapted to engage beveled portions 11$^b$ and 12$^b$ of the collars 11 and 12. It will be understood that the wedges 13 are beveled both on their front and rear edges. The arm 15 has an enlarged tubular head-portion 15$^a$, which is interposed between the upper ends of the wedges 13, and the parts are connected by a bolt 17. The spacing sleeve 18 is interposed between the lower ends of the wedges, and said lower ends are connected by a bolt 19. The bolts serve to prevent the wedge-members from separating. The spring E preferably comprises a heavy conical spring having its large end bearing against the clamping-disk C and having its small end bearing against the inner end-portions of the levers D. The spring E is of ample strength to cause the levers to force the clamping disk C' rearwardly and effectively clamp the friction-disk A' between the clamping disks. The clutch may be released, however, by forcing the foot-lever 16 forwardly and causing the arm 15 to depress the wedges 13, thus forcing the collar 11 forwardly and causing the inner ends of the levers to compress the large spring E, thus relieving the pressure of the outer ends of the levers upon the clamping-member C'.

The collar 12 is threaded upon the shaft B and secured in position by a lock-nut 20. Thus the collar 12 may be adjusted to compensate for any wear of the parts, and to insure proper release of the clutch. The insert member 12$^a$, which bears against the wedge-members, rotates freely in the recessed bearing provided therefor in the collar 12; or, rather, the member 12$^a$ may stand still while engaged by the wedges 13, while the shaft B may continue to rotate.

It will be noted that by allowing the inner ends of the levers D to project past the sides of the shaft B, a longer leverage is available in effecting release of the clutch.

The improved construction is simple, compact, provides for effective gripping of the clutch members, and the release of the clutch may be effected with ease. When it is desired to renew the friction-disk A', the sectional construction of said element and the manner of mounting the same renders such renewal an easy matter.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:

1. In clutch mechanism, the combination of a shaft, a clamping-member secured on one end thereof and equipped with fulcrum members, a second shiftable clamping-member, levers mounted on said fulcrum members and having short arms engaging the shiftable clamping-member and having long arms extending towards the shaft, a spring interposed between said levers and said first-named clamping-member, a wheel equipped with a clutch member which extends between said clamping-members, and means connected with said shaft for actuating said levers to effect release of the clutch.

2. In clutch mechanism, the combination of a shaft, a clamping-member mounted on one end thereof, studs projecting from said clamping-member, a shiftable clamping-member carried by said studs, levers carried by said studs and engaging said second-named clamping-member, a spring interposed between the first-mentioned clamping member and said levers, a wheel equipped with a clutch member extending between said clamping members, and means associated with said shaft for actuating said levers to effect release of the clutch.

3. In clutch mechanism, the combination of a wheel having its peripheral portion equipped with a clutch member, a shaft having one end adjacent said wheel and equipped with a clamping-member disposed between said clutch member and said wheel, a second shiftable clamping-member carried by said first-named clamping-member, levers carried by said first-named clamping-member and disposed in a plane parallel with the clamping-members, the outer ends of said levers engaging said second-named clamping-member and the inner ends of said levers being disposed adjacent the shaft, a spring interposed between said levers and first-mentioned clamping-member, and means associated with said shaft for actuating said levers to effect release of the clutch.

4. In clutch mechanism, the combination of a wheel having its peripheral portion equipped with an annular clutch-member, a shaft, a clamping-member secured on said shaft and adapted to engage one side of said clutch-member, a shiftable clamping-member carried by said first-named clamping member, levers carried by said first-named clamping-member, a spring interposed between said levers and said first-named clamping-member, a collar shiftably mounted on said shaft and engaging said levers, a second collar secured on said shaft, wedge-members interposed between said collars, and means for actuating said wedge-members.

5. In clutch mechanism, the combination of a wheel having its peripheral portion equipped with an annular clutch-member, a shaft having an end portion equipped with a clamping member adapted to engage the inner side of said clutch member, studs mounted on said clamping-member, a shiftable clamping-member mounted on said studs, levers disposed parallel with the outer side of said second-named clamping member and mounted on said studs, said levers having short arms engaging said second-named clamping-member and having long arms projecting past the sides of said shaft, a spring interposed between said first-named clamping-member and said levers, a collar shiftably mounted on said shaft and engaging the long arms of said levers at the sides of said shaft, and means for shifting said collar to actuate the levers and effect release of the clutch.

JACOB LAUTH.